(12) United States Patent
Liao

(10) Patent No.: US 10,837,349 B2
(45) Date of Patent: Nov. 17, 2020

(54) FLUID INJECTION DEVICE FOR VEHICLE RADIATOR AND METHOD TO USE THE SAME

(71) Applicant: LIH YANN INDUSTRIAL CO., LTD., Taichung (TW)

(72) Inventor: Po-Lin Liao, Taichung (TW)

(73) Assignee: LIH YANN INDUSTRIAL CO., LTD., Taichung (TW)

(*) Notice: Subject to any disclaimer, the term of this patent is extended or adjusted under 35 U.S.C. 154(b) by 70 days.

(21) Appl. No.: 16/268,877

(22) Filed: Feb. 6, 2019

(65) Prior Publication Data
US 2020/0248613 A1 Aug. 6, 2020

(51) Int. Cl.
| F28D 15/00 | (2006.01) |
| F01P 11/02 | (2006.01) |
| F01P 7/00 | (2006.01) |
| F28F 9/22 | (2006.01) |
| B60K 11/02 | (2006.01) |

(52) U.S. Cl.
CPC ............ *F01P 11/028* (2013.01); *F01P 7/00* (2013.01); *B60K 11/02* (2013.01); *F28F 9/22* (2013.01); *F28F 2275/20* (2013.01)

(58) Field of Classification Search
CPC . F01P 11/028; F01P 7/00; B60K 11/02; F28F 9/22; F28F 2275/20
USPC ..................................................... 165/104.32
See application file for complete search history.

(56) References Cited

U.S. PATENT DOCUMENTS

| 5,293,754 A | * | 3/1994 | Mizuno | ................. | H01L 23/473 |
| | | | | | 165/104.27 |
| 8,272,428 B2 | * | 9/2012 | Fujii | ....................... | F28D 15/00 |
| | | | | | 165/100 |
| 2007/0227702 A1 | * | 10/2007 | Bhatti | ..................... | F28D 7/024 |
| | | | | | 165/104.21 |
| 2007/0240434 A1 | * | 10/2007 | Allen | ....................... | F01P 11/16 |
| | | | | | 62/129 |
| 2014/0174708 A1 | * | 6/2014 | Akiyama | ................ | B60R 16/00 |
| | | | | | 165/202 |

* cited by examiner

*Primary Examiner* — Davis D Hwu
(74) *Attorney, Agent, or Firm* — Muncy, Geissler, Olds & Lowe, PC

(57) ABSTRACT

A fluid injection device for vehicle radiator includes a main body. The main body includes a negative pressure device, a container, an injection opening, and a switching mechanism. The injection opening is adapted for connecting with an opening of a radiator of a vehicle. The negative pressure device and the container communicate the injection opening respectively.

8 Claims, 4 Drawing Sheets

FLUID INJECTION DEVICE FOR VEHICLE RADIATOR AND METHOD TO USE THE SAME

BACKGROUND OF THE INVENTION

Field of the Invention

The present invention relates to a fluid injection device for vehicle radiator and a method to use the same.

Description of the Prior Art

A radiator is adapted for the cooling system of vehicle. The fluid in the radiator is used to cool the engine down. The radiator has to be replenished with fluid often. To prevent gas from remaining in the radiator, a pipe connected to an aspirator is usually inserted into the radiator opening to suck the gas out. Thereafter, the aspirator is removed, and the pipe is inserted into a fluid tank so that the fluid in the fluid tank flows into the radiator. However, when removing the aspirator, gas may flow back into the radiator. Besides, when the process of fluid replenishing is finished and the pipe is removed, fluid may overflow from the pipe. Thus, the process is quite difficult.

SUMMARY OF THE INVENTION

The main object of the present invention is to provide a fluid injection device for vehicle radiator and a method to use the fluid injection device to quickly inject fluid into the radiator and to prevent gas from remaining in the radiator. In addition, the device is easy to operate.

To achieve the above and other objects, a fluid injection device for vehicle radiator includes a main body. The main body includes a negative pressure device, a container, an injection opening, and a switching mechanism. The injection opening is adapted for connecting with an opening of a radiator of a vehicle. The negative pressure device and the container communicate the injection opening respectively. The switching mechanism selectively blocks communication between the injection opening and at least one of the negative device and the container.

To achieve the above and other objects, a method to use fluid injection device for vehicle radiator includes the following steps: providing a main body including a negative pressure device, a container, an injection opening, and a switching mechanism, the injection opening being adapted for connecting to an opening of a radiator of a vehicle, the negative pressure device and the container communicating the injection opening respectively, the switching mechanism selectively blocking communication between the injection opening and at least one of the negative pressure device and the container; when the switching mechanism blocks communication between the container and the injection opening and keeps communication between the negative pressure device and the injection opening, the negative pressure device sucking gas in the radiator of the vehicle out via the injection opening so that the radiator has a lower pressure inside than a pressure outside, thereafter the switching mechanism blocking communication between the injection opening and the negative pressure device and keeping communication between the container and the injection opening so that fluid in the container flows into the radiator of the vehicle via the injection opening.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
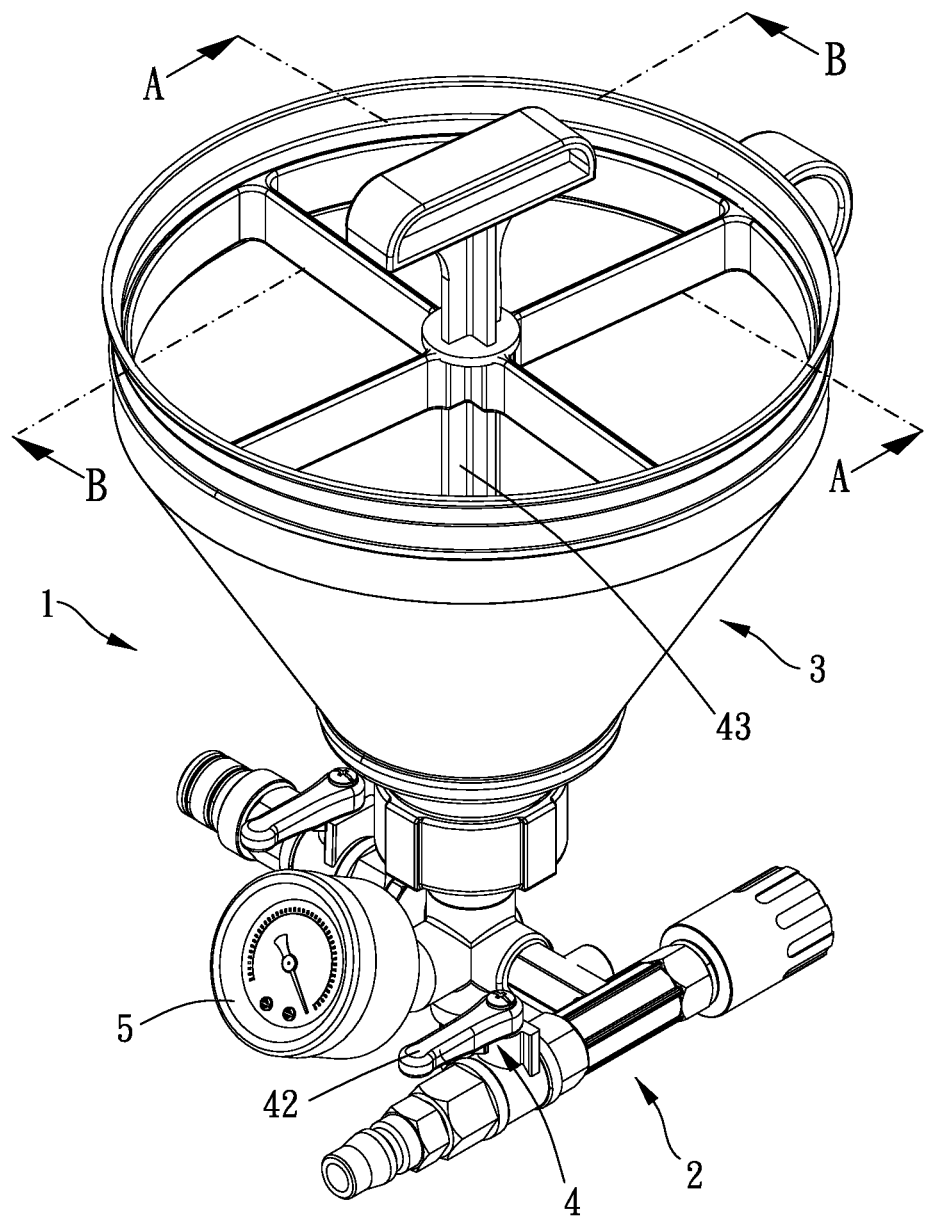
FIG. 1 is a stereogram of the present invention.
Figure 2:
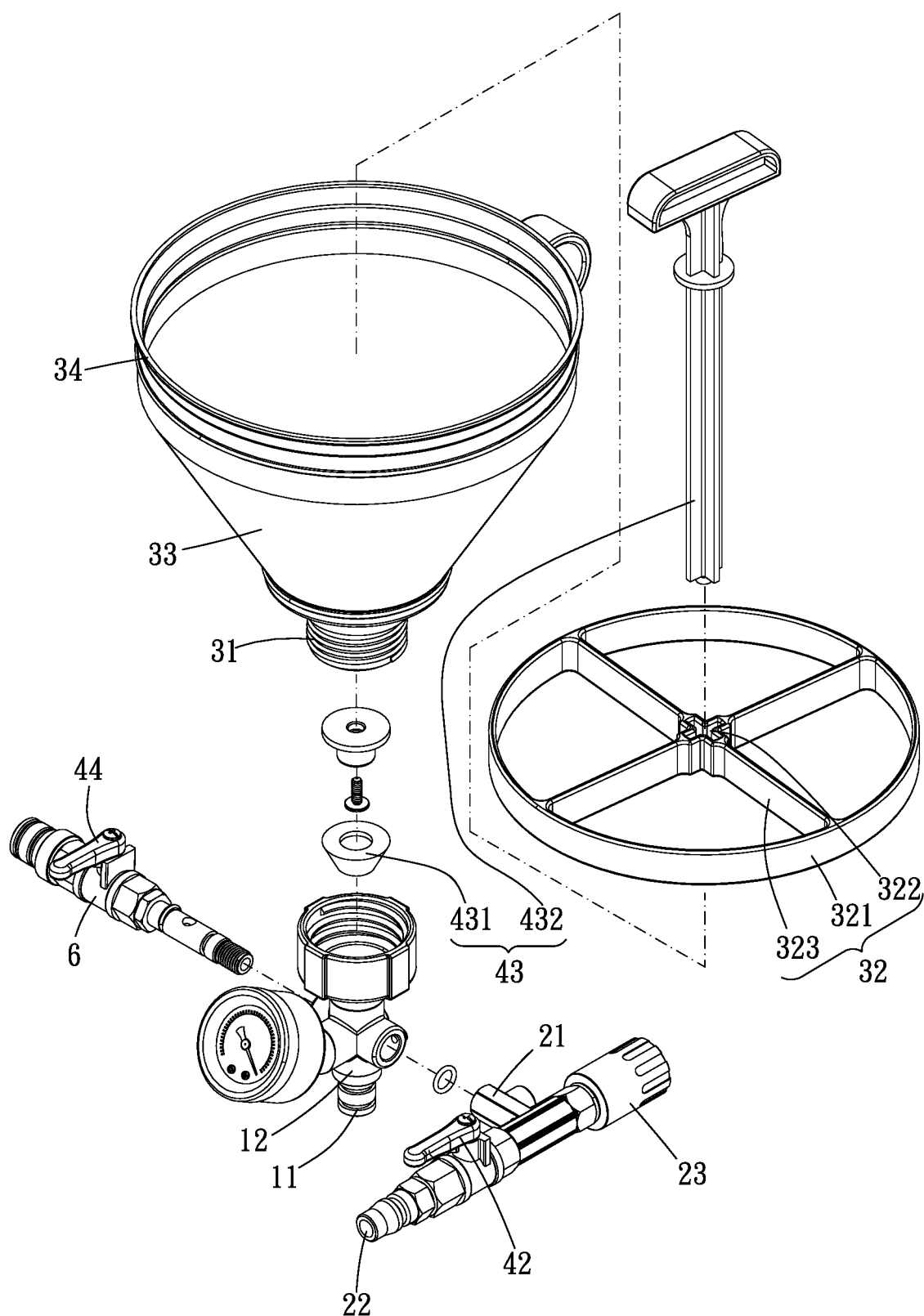
FIG. 2 is a breakdown drawing of the present invention.
Figure 3:
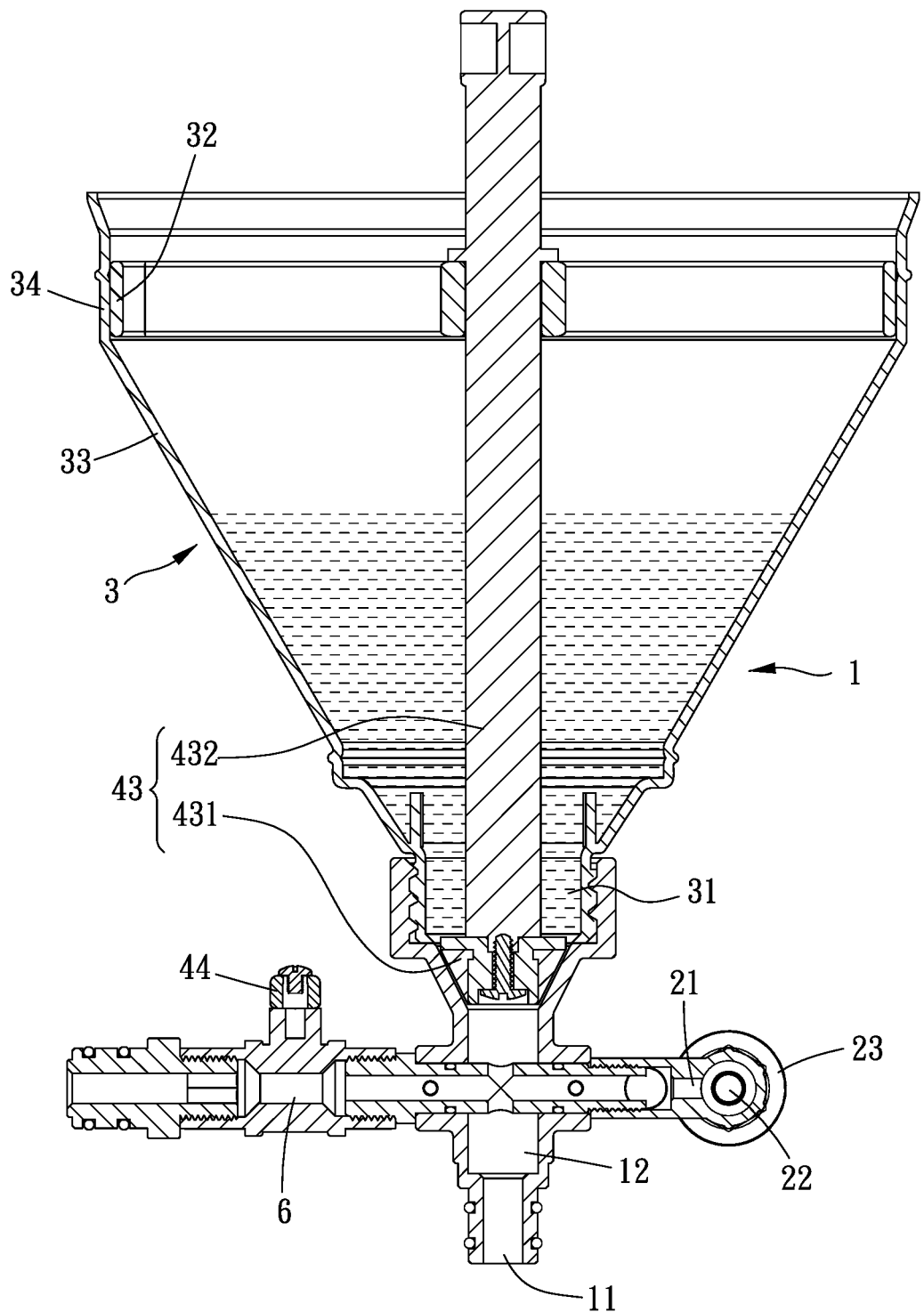
FIG. 3 is an A-A profile of the present invention.
Figure 4:
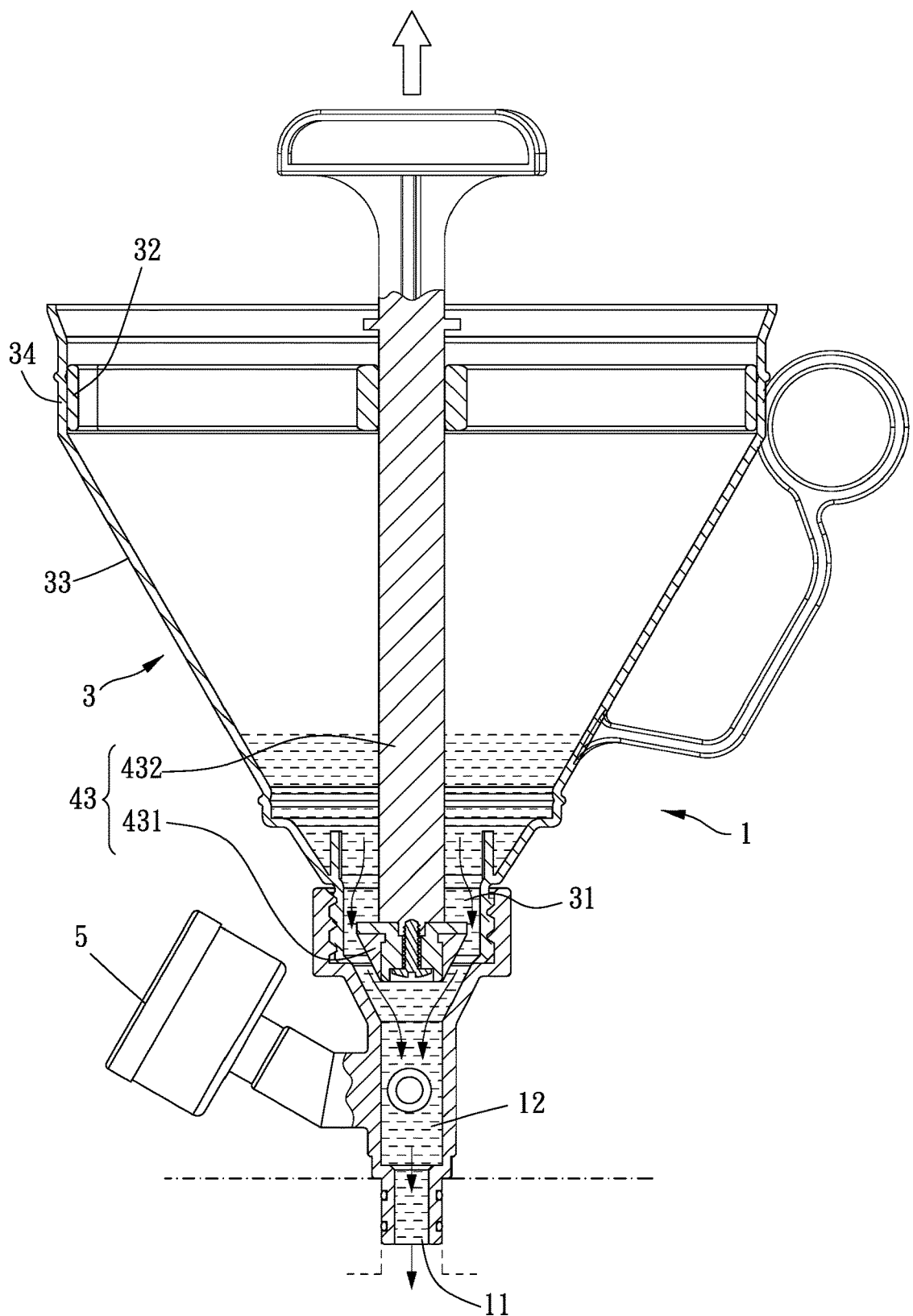
FIG. 4 is a B-B profile of the present invention.

Please refer to FIG. 1 to FIG. 4, the fluid injection device for vehicle radiator of the present invention includes a main body 1. The main body 1 includes a negative pressure device 2, a container 3, an injection opening 11, and a switching mechanism 4. The injection opening 11 is adapted for connecting to an opening of a radiator of a vehicle. The negative pressure device 2 and the container 3 communicate the injection opening 11 respectively. The switching mechanism 4 selectively blocks communication between the injection opening 11 and at least one of the negative pressure device 2 and the container 3. In the present embodiment, the switching mechanism 4 is able to block communication between the negative pressure device 2 and the injection opening 11 and communication between the container 3 and the injection opening 11 at the same time.

The method to use fluid injection device for vehicle radiator of the present invention includes the following steps. When the switching mechanism 4 blocks communication between the container 3 and the injection opening 11 and keeps communication between the negative device 2 and the injection opening 11, the negative pressure device 2 sucks the gas in the radiator of the vehicle out via the injection opening 11 so that the pressure inside the radiator is lower than the pressure outside. Thereafter, the switching mechanism 4 blocks communication between the negative pressure device 2 and the injection opening 11 and allows communication between the container 3 and the injection opening 11 so that the fluid in the container 3 flows into the radiator via the injection opening 11. Thereby, the radiator can be filled with fluid without gas remaining. Specifically, the switching mechanism 4 controls communication between the injection opening 11 and each of the negative pressure device 2 and the container 3, so the fluid can be kept in the container 3 by filling the container 3 up with the fluid and blocking communication between the container 3 and the injection opening 11. When the gas in the radiator is discharged by the negative pressure device 2 to make the radiator have a lower pressure than the pressure outside, the fluid in the container 3 may be sucked into the radiator by blocking communication between the negative pressure device 2 and the injection opening 11 and allowing communication between the container 3 and the injection opening 11. When the radiator is full with the fluid, communication between the container 3 and the injection opening 11 can be blocked to end the injection process.

Specifically, the main body 1 includes a first channel 12. The injection opening 11 is arranged at an end of the first channel 12. Each of the negative pressure device 2 and the container 3 communicates the first channel 12 respectively. The switching mechanism 4 selectively blocks communication between the first channel 12 and at least one of the negative pressure device 2 and the container 3.

More specifically, the negative pressure device 2 includes a second channel 21. The second channel 21 has a second opening 22 at an end thereof An other end of the second channel 21 communicates the first channel 12 to be located between the container 3 and the injection opening 11. The switching mechanism 4 further includes a second switch 42. The second switch 42 is disposed on the second channel 21 to selectively block communication between the second opening 22 and the first channel 12. For example, in the present embodiment, the negative pressure device 2 further includes a check valve 23. The check valve 23 communicates the second channel 21 and is aligned with the second opening 22. The check valve 23 only allows fluid to be discharged from the second channel 21 via the check valve 23. The second opening 22 is adapted for connecting to an air compressor. When the high-speed gas from the air compressor enters the second opening 22 and is discharged from the negative pressure device 2 via the check valve 23, the first channel 12 has a lower pressure, and the gas in the radiator of the vehicle is sucked out to flow through the first channel 12 and the second channel 21 and is discharged via the check valve 23. In other possible embodiments, the negative pressure device 2 can have no check valve, and the second opening communicates an air exhauster.

Besides, the container 3 has a third channel 31. An end of the third channel 31 communicates the first channel 12 and is located between the container 3 and the injection opening 11. The switching mechanism 4 further includes a third switch 43. The third switch 43 is disposed on the third channel 31 to selectively block communication between the third channel 31 and the first channel 12. Specifically, the third switch 43 includes a sealing member 431 to selectively block an end of the first channel 12 connected to the third channel 31. The sealing member 431 normally blocks communication between the first channel 12 and the third channel 31 due to gravity so that the fluid in the container 3 may not flow into the first channel 12 freely.

Preferably, the third switch 43 further includes a rod member 432. The sealing member 431 is arranged at an end of the rod member 432. The sealing member 431 is conical, and the first channel 12 has an inner contour which is tapered to fit the sealing member 431 for sealing. The container 3 has a positioning member 32. The rod member 432 is slidably disposed on the positioning member 32. Specifically, in the present embodiment, the positioning member 32 includes a ring member 321, an insertion portion 322, and a plurality of rib members 323 connected the ring member 321 and the insertion position 322 therebetween. The container 3 has a conical body 33 and a circumferential wall 34. The third channel 31 is arranged at an end of the conical body 33 remote from the circumferential wall 34. The ring member 321 is coupled to an inner face of the circumferential wall 34. The rod body 432 is slidably inserted through the insertion portion 322. Thereby, the rod member 432 is erected in the container 3 even if the rod member 432 is not held by user's hand. Thus, the sealing member 431 can effectively block communication between the first channel 12 and the third channel 31.

In the present embodiment, the fluid injection device further includes a pressure meter 5 and a fourth channel 6. The pressure meter 5 is disposed on the main body 1 and communicates the first channel 12. The pressure meter 5 is adapted for showing the pressure in the first channel 12 to acquire the pressure in the radiator. An end of the fourth channel 6 communicates the first channel 12. The switching mechanism 4 further includes a fourth switch 44 disposed on the fourth channel 6 to selectively block communication between the fourth channel 6 and the first channel 12. The fourth channel 6 is adapted for connecting to a fluid source. Thereby, the fluid is able to flow into the first channel 12 via the fourth channel 6 to inject into the radiator of vehicle.

In other possible embodiments, the second, the third, and the fourth switches are not necessary for the switching mechanism. The switching mechanism can just have a switching valve disposed on the first channel, and the second, the third, and the fourth channels communicate the switching valve. The switching valve can selectively allow one of the second, the third, and the fourth channels to communicate with the first channel.

In conclusion, the negative pressure device can suck the gas in the radiator out to make the pressure inside the radiator lower than the pressure outside. Thereafter, communication between the negative pressure device and the injection opening is blocked, and communication between the container and the injection opening is opened so that the fluid in the container flows into the radiator due to gravity and the lower pressure inside the radiator. When the radiator is filled up with the fluid, communication between the container and the injection opening can be blocked again to complete the process. Thereby, the present invention is able to prevent gas from flowing back into the radiator.

What is claimed is:

1. A fluid injection device for vehicle radiator, including:
    a main body, including a negative pressure device, a container, an injection opening, and a switching mechanism, the injection opening being adapted for connecting with an opening of a radiator of a vehicle, the negative pressure device and the container communicating the injection opening respectively, the switching mechanism selectively blocking communication between the injection opening and at least one of the negative device and the container,
    wherein the main body includes a first channel, the injection opening is located at an end of the first channel, the negative pressure device and the container communicate the first channel respectively, the switching mechanism selectively blocks communication between the first channel and at least one of the negative device and the container;
    wherein the negative pressure device includes a second channel, the second channel has a second opening at an end thereof, an other end of the second channel communicates the first channel and is located between the container and the injection opening, the switching mechanism further includes a second switch, the second switch is disposed on the second channel to selectively block communication between the second opening and the first channel.

2. The fluid injection device for vehicle radiator of claim 1, wherein the negative pressure device further includes a check valve, the check valve is arranged in the second channel to be aligned with the second opening, the check valve only allows fluid to be discharged from the second channel.

3. The fluid injection device for vehicle radiator of claim 2, wherein the container has a third channel, an end of the third channel is in communication with the first channel and located between the container and the injection opening, the switching mechanism further includes a third switch, and the third switch is disposed on the third channel to selectively block communication between the third channel and the first channel.

4. The fluid injection device for vehicle radiator of claim 3, wherein the third switch includes a sealing member, the sealing member selectively blocks communication between the first channel and an end of the third channel.

5. The fluid injection device for vehicle radiator of claim 4, wherein the third switch further includes a rod member, the sealing member is disposed on an end of the rod member, the sealing member is conical, the container has a positioning member, the rod member is slidably inserted through the positioning member.

6. The fluid injection device for vehicle radiator of claim 5, wherein the positioning member includes a ring member, an insertion portion, and a plurality of rib members connecting the ring member and the insertion portion therebetween, the container has a conical body and a circumferential wall connected together, the third channel is arranged at an end of the conical body remote from the circumferential wall, the ring member is coupled to an inner face of the circumferential wall, the rod member is slidably inserted through the insertion portion.

7. The fluid injection device for vehicle radiator of claim 3, further including a pressure meter and a fourth channel, the pressure meter being disposed on the main body and communicating the first channel, an end of the fourth channel communicating the first channel, the switching mechanism further including a fourth switch, the fourth switch being disposed on the fourth channel to selectively block communication between the fourth channel and the first channel.

8. A method to use fluid injection device for vehicle radiator, including steps of:

providing a main body including a negative pressure device, a container, an injection opening, and a switching mechanism, the injection opening being adapted for connecting to an opening of a radiator of a vehicle, the negative pressure device and the container communicating the injection opening respectively, the switching mechanism selectively blocking communication between the injection opening and at least one of the negative pressure device and the container; when the switching mechanism blocks communication between the container and the injection opening and keeps communication between the negative pressure device and the injection opening, the negative pressure device sucking gas in the radiator of the vehicle out via the injection opening so that the radiator has a lower pressure inside than a pressure outside, thereafter the switching mechanism blocking communication between the injection opening and the negative pressure device and keeping communication between the container and the injection opening so that fluid in the container flows into the radiator of the vehicle via the injection opening.

\* \* \* \* \*